United States Patent [19]

Ettlinger et al.

[11] 4,307,023

[45] Dec. 22, 1981

[54] HYDROPHOBIC FILLER MIXTURES, PROCESS FOR ITS PRODUCTION AND USE

[75] Inventors: Manfred Ettlinger, Hanau; Karl-Hans Müller, Bruchkobel; Edgar Simon, Freigericht, all of Fed. Rep. of Germany

[73] Assignee: Degussa Aktiengesellschaft, Frankfurt, Fed. Rep. of Germany

[21] Appl. No.: 165,645

[22] Filed: Jul. 3, 1980

[30] Foreign Application Priority Data

Jul. 21, 1979 [DE] Fed. Rep. of Germany ....... 2929587

[51] Int. Cl.³ .......................... C09C 3/12; C08K 3/36
[52] U.S. Cl. ........................ 260/37 SB; 106/288 B; 106/308 Q; 260/29.1 SB
[58] Field of Search ................. 260/37 SB, 29.1 SB; 106/288 B, 308 Q

[56] References Cited

U.S. PATENT DOCUMENTS 3,957,683  5/1976  Hittmair et al. ............... 260/37 SB
4,176,093  11/1979  Zoch ............................. 260/37 SB

FOREIGN PATENT DOCUMENTS 6714210  4/1969  Netherlands .................... 106/288 B

*Primary Examiner*—Wilbert J. Briggs, Sr.
*Attorney, Agent, or Firm*—Cushman, Darby & Cushman

[57] ABSTRACT

There is produced a hydrophobic mixture for RTV and LTV silicone rubber by applying a hydrophobizing agent to a precipitated silica, homogeneously mixing this powdery concentrate into a pyrogenically produced silica, tempering the mixture and mechanically compacting. The hydrophobic filler mixture obtained in the untempered condition consists of:

Pyrogenically produced silica: 50 to 85 weight %
Precipitated silica: 5 to 40 weight % (e.g. 5 to 30 weight %)
Hydrophobization agent: 8 to 30 weight %
Aluminum oxide: 0.5 to 5 weight %.

11 Claims, No Drawings

HYDROPHOBIC FILLER MIXTURES, PROCESS FOR ITS PRODUCTION AND USE

BACKGROUND OF THE INVENTION

The invention is directed to a hydrophobic filler mixture, a process of producing it and its use as a filler in RTV (room temperature vulcanization) and LTV (low temperature vulcanization) silicone rubber.

RTV-silicone rubbers generally are produced in two different types of reaction systems. The first general type is the so-called two component system in which the crosslinking element is an alkyl silicate or an alkoxy silane. This system above all is characterized by a spontaneous vulcanization if the crosslinking element and catalyst are mixed.

The second general type is the so-called single component system in which a polymer, a crosslinking element and in a given case a catalyst are mixed together in the absence of moisture. This mixture cross-links in the subsequent contact with moisture in which case above all, the atmospheric mositure is used (see British Pat. No. 1,110,429. The entire disclosure of British Pat. No. 1,110,429 is hereby incorporated by reference).

It is known to employ in single component or two component RTV-silica rubber compositions as fillers precipitated silica or pyrogenically produced silica in which case the silicas, optionally with linear siloxanes, cyclic siloxanes, halosilanes, silanols or alkoxysilanes are hydrophobized (see Great Britain Pat. No. 1,110,429).

These fillers, however, in part exhibit disadvantages which can negatively effect the quality of the RTV silicone rubber composition. Thus it is possible that these fillers impart a lower rigidity as well as insufficient storage stability to the silicone rubber composition and the hardened silicone rubber compositions exhibit unsatisfactory mechanical properties.

Besides in using the relatively easily volatile hydrophobizing agents there exist work place hydiene considerations.

SUMMARY OF THE INVENTION

According to the invention there is provided a hydrophobic filler mixture consisting essentially of in the untempered condition.
Pyrogenically produced silica: 50 to 85 weight %
Precipitated silica: 5 to 40 weight %
Hydrophobization agent: 8 to 30 weight %
Aluminum oxide: 0.5 to 5 weight %

There is provided by the invention a process for the production of the hydrophobic filler-mixture which is characterized by mixing 8 to 30 parts of hydrophobization agent with 5 to 40 parts of precipitated silica adding 50 to 85 parts of pyrogenically produced silica, mixing, adding 0.5 to 2.0 parts of aluminum oxide, mixing, tempering the thus obtained mixture for 0.5 to 3 hours at 250° to 330° C. and compacting the thus obtained product to a bulk density of 80 to 150 g/l.

As hydrophobizing agent there can be employed organosilicon compounds, as e.g. silicone oils which consist of linear or cyclic organopolysiloxanes. The free valences of the silicon not bonded to oxygen can be taken up by organic groups or hydrogen. Their viscosity at 20° C. can be between 3 and 1,000 mPaS, preferably between 20 and 500 mPaS. In an especially preferred illustrative form of the invention the viscosity can be between 20 and 100 mPaS. Further hydrophobizing agent in the thought of the invention include silicone oils such as branched and/or linear dimethyl polysiloxanes having a kinematic viscosity of 5 to 3000 centistokes.

The organic groups of the organopolysiloxane which can be the same or different can be alkyl, e.g. lower alkyl, alkenyl e.g. lower alkyl, aryl, aralkyl, alkarly, cycloalkyl or cycloalkenyl groups. Suitable groups are e.g. methyl, ethyl, propyl, butyl, isopropyl, phenyl, tolyl (e.g. o-tolyl, p-tolyl or m-tolyl), benzyl, vinyl, allyl, methallyl, cyclopentyl, cyclohexyl or cyclohexenyl groups. Generally, however, there are used methyl and/or phenyl groups with or without a portion of vinyl groups. Suitable siloxanes include for example hexamethylcyclotrisiloxane, octamethyl cyclotetrasiloxane, tetramethyltetravinylcyclotetrasiloxane, decamethylcyclopentasiloxane, hexamethyldisiloxane, sym.-tetramethyldivinylsiloxane, sym.-trimethyltriphenylcyclotrisiloxane, octamethyltrisiloxane, decamethyltetrasiloxane and other linear diorganopolysiloxanes, including diorganopolysiloxanes with hydroxy and end groups, such as 1,7-dihydroxyoctamethyltetrasilosane, 1.9-dihydroxydecamethylpentasiloxane and 1,11-dihydroxyduodecamethylhexasiloxane. Further usable siloxanes are 1,3,5,8-hexamethyldisiloxane, 1,3-divinyl-1,1,3,3-tetramethyldisiloxane and 1,3,5-trimethyl-1,3,5-triphenylcyclotrisiloxane.

As precipitated silica there can be used silicas with the following physical-chemical properties:

| BET-Surface Area | m²/g | 100–300 |
|---|---|---|
| Average primary particle size | nm | 7–18 |
| Bulk density according to DIN 53 194 | g/l | 70–300 |
| Lost after drying DIN 55 921 | % | 2–6 |
| Loss on ignition according to DIN 55 921 | % | 4–8 |
| pH According to DIN 53 200 | | 5–7 |

DIN stands for "German Industrial Standard"

As pyrogenically produced silica there can be used silicas with the following physical-chemical properties:

| BET-surface area | m²/g | 50–400 |
|---|---|---|
| Average Particle Size | nm | 7–40 |
| Bulk Density according to DIN 53 194 | g/l | 40–120 |
| Loss on drying according to DIN 55 921 | % | 1–2 |
| Loss on ignition according to DIN 55 921 | % | 1–2 |
| pH according to DIN 53 200 | | 3–5 |

As aluminum oxide there can be used an aluminum oxide produced pyrogenically.

There can be advantageously used a cross beater mill to mix the individual components. However, if the hydrophobizing agent is of low viscosity there can also be used a fluidized bed, air stream, centrifugal or screw mixer. With more highly viscous hydrophobizing agents there can be used with advantage intensive mills.

The mixing time can amount to up to 3 minutes.

The addition of the pyrogenically produced silica can be carried out in any desired number of portions according to the type of mixing apparatus used.

The tempering of the product mixture can be carried out at a temperature of 250° to 330° C., preferably from 290° to 310° C.

The compacting can take place by means of a ball mill, by means of rolls or the known vacuum method.

After the tempering and compacting the filler mixture of the invention can show the following physical-chemical properties:

Loss on drying (DIN 55 921): 0.1 to 0.6%
Loss on ignition (DIN 55 921): 2.6 to 3.9%
pH (DIN 53 200): 6.0 to 7.5%
Methanol wettability: 52 to 60
Carbon content: 3.0 to 4.0%

The use of fillers obtained according to the process of the invention in compositions hardenable to elastomers based on diorganopolysiloxanes is likewise an object of the invention.

It is especially advantageous to use the filler mixture according to the invention in two component packings of room temperature vulcanizable mixtures which are vulcanized by cross-linking of liquid terminal silanol containing diorganopolysiloxanes with polyfunctional cross-linking agents. The filler-mixture according to the invention is valuable for this purpose because with the use in combination with the terminal silanol residue containing polydiorganosiloxane it produces neither a substantial thickening of the liquid nor a "structuring" nor solidification if the filler-mixture is mixed in higher proportions.

As the diorganopolysiloxane there can be used all diorganopolysiloxanes which previously had been or could be used as the basis for compositions hardenable or hardening to organopolysiloxane elastomers at room temperature (RTV) or only slightly elevated temperature (LVT). They can be represented e.g. by the general formula

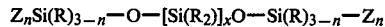

where the R groups are the same or different, univalent, optionally substituted and/or polymer hydrocarbon residues, Z is a hydroxyl group, hydrolyzable groups and/or a hydrolyzable atom or in the case of the presence of composition which is hardenable at only slightly elevated temperature alkenyl groups, n is 1, 2 or 3 and x is a whole number of at least 1.

Within or along the siloxane chain in the above given formula there can, also be present (which is is customarily not represented in these types of formula) other siloxane units as diorganosiloxane units, for the most part only as impurities, e.g. those of the formula $RSiO_{3/2}$, $R_3SiO_{1/2}$ and $SiO_{4/2}$ where R in each case has the above stated meaning. The amount of these other siloxane units should not exceed 10 mole percent.

Examples of hydrocarbon groups for R are alkyl groups, e.g. of 1 to 8 carbon atoms such as methyl, ethyl, propyl, isopropyl, butyl, hexyl and octyl groups, alkenyl groups such as vinyl, allyl, methallyl, ethallyl and butadienyl groups and aryl groups such as phenyl and tolyl (e.g. o-tolyl, p-tolyl, m-tolyl) groups.

Examples of substituted hydrocarbon groups for R are especially halogenated hydrocarbon groups as the 3,3,3-trifluoropropyl group, chlorophenyl (e.g. p-chlorophenyl, o-chlorophenyl) and bromotolyl groups (e.g. 2-bromo-4-methylphenyl); and cyanoalkyl groups such as the beta-cyanoethyl group.

Examples of polymers (also designatable as "modifying") substituted and unsubstituted hydrocarbon groups for R are polystyryl, polyvinyl acetate, polyacrylate, polymethylacrylate and polyacrylonitrile groups bonded via carbon to silicone.

At least the preponderant portion of the group R, pregerably consists of above all, methyl groups because of their ready accessibility. When there are present other groups for R these are especially vinyl and/or phenyl groups.

Particularly in the case of the presence of single component systems storable under exclusion of water, hardening at room temperature to elastomers with the introduction of water it is a matter of Z being for the most part hydrolyzable groups. Examples of such groups are amino, amido, aminoxy, oxime, alkoxy (e.g. methoxy, ethoxy or propoxy), alkoxyalkoxy, e.g. methoxyethoxy ($CH_3OC_2CH_2O$—) or ethoxy ethoxy, alkenyloxy

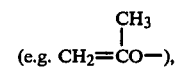

(e.g. $CH_2=CO-$), acyloxy (e.g. acetoxy, propionoxy) and phosphate groups. Above all because of their easily accessibility there are preferred as Z acyloxy groups, particularly acetoxy groups. However, there are also obtained excellent products when Z contains oxime groups, such as those of the formula $-ON=C(CH_3)(C_2H_5)$.

Examples of hydrozable atoms for Z are halogen e.g. chlorine, bromine or iodine and hydrogen atoms.

Examples of alkenyl groups for Z are particularly vinyl groups.

There can be bound to a Si-atom the same or different Z groups.

It is advantageous if inter alia there are present compositions hardenable to elastomers those which are able to be worked without the co-use of solvents by casting or painting. The viscosity of the RTV diorganopolysiloxanes used within the bounds of the invention therefore should not exceed 5,000,000 cp at 25° C., preferably not over 150,000 cp at 25° C. Correspondingly the value of x preferably should not exceed 40,000.

There can be used mixtures of different diorganopolysiloxanes.

There are produced by mixing the hydrophobic fillers according to the invention with diorganopolysiloxanes, and optionally further materials, at room temperature or only slightly elevated temperature, in a given case after addition of cross-linking agents, compositions hardenable to elastomers, particularly compositions storable with the exclusion of water, hardenable at room temperature upon introduction of water to elastomers. This mixing can take place in any desired manner, e.g. in mechanical mixing apparatus. It is carried out very quickly and easily and it is immaterial in what order the addition of the ingredients of the mixture takes place.

Preferably the filler-mixture used in the invention is employed in an amount of 5 to 50 weight %, preferably 5 to 40 weight %, based on the total weight of the composition hardenable to an elastomer.

If in the reactive terminal units containing diorganopolysiloxanes there are present single reactive terminal groups those with Si-bound hydroxyl groups than these diorganopolysiloxanes (in order to be hardened in known manner or to be converted through the water contained in the air, in a given case with addition of further water, to compounds hardening to elastomers) must be reacted in known manner with a cross-linking agent, in a given case in the presence of a condensation agent.

Examples of cross-linking agents especially are silanes of the general formula $$R_{4-t}SiZ'_t$$

where R has the above given meaning, Z is a hydrolyzable group and/or hydrolyzable atom and t is 3 or 4. The above mentioned examples for hydrolyzable groups Z and hydrolyzable atoms Z are also valid to the full extent for the hydrolyzable groups Z' and the hydrolyzable atoms Z'.

Examples of silane of the above stated formula are methyl triacetoxy silane, isopropyl triacetoxy silane, isopropoxy triacetoxy silane, vinyl triacetoxy silane, methyl tris(diethylaminooxy) silane, methyl tris(cyclohexylamino)-silane, methyl tris(diethyl phosphato) silane and methyl tris(methylethylketoximo) silane.

In place of or in admixture with silanes of the above stated formula there can furthermore be used e.g. also polysiloxanes which contain in each molecule at least 3Z-groups or atoms, in which case the silicon valences not satisfied by Z' groups or atoms are satisfied by siloxane oxygen atoms and in a given case R groups. The best known examples of cross-linkers of the latter type are polyethyl silicate with an $SiO_2$ content of about 40 weight %, hexaethoxy disiloxane and methyl hydrogen polysiloxane. The best known examples of condensation catalysts are tin salts of fatty acids such as dibutyltin dilaurate and tin (II) octoate.

If there are present in the diorganopolysiloxane containing reactable terminal units those with alkenyl groups then there can take place the hardening to elastomers in known manner with organopolysiloxanes which contain on the average at least 3 Si-bonded hydrogen atoms per molecule, such as methyl hydrogen polysiloxane, in the presence of catalysts, such as platinum (IV) chloric acid, promoting the addition of alkenyl groups on Si-bonded hydrogen. Then there are present at room temperature or only slightly elevated temperature (for the most part 50° to 80° C.) hardenable (LTV) compositions.

Finally there may be mentioned as further examples for the hardening to elastomers those by means of polycyclic organopolysiloxanes in the presence of equilibrium catalysts, such as phosphorus nitrile chlorides.

It goes without saying that the compositions hardenable to elastomers can contain besides diorganopolysiloxanes, according to the invention hydrophobic filler cross-linking agents and cross-linking catalysts, in a given case conventional mostly or frequently used fillers in compositions hardenable into elastomers. Examples of such materials are fillers with a surface area below 50 $m^2/g$ such as quartz meal, diatomaceous earth, additionally zirconium silicate and calcium carbonate, additionally untreated, wet precipitated silica, organic resins such as polyvinyl chloride powders, organopolysiloxane resins, fibrous fillers such as asbestos, glass fibers and organic fibers, pigments, soluble dyestuffs, perfumes, corrosion inhibitors, the agents stabilizing compositions against the influence of water such as acetic anhydride, hardening retarding agents such as benzotriazole and plasticizers such as dimethyl polysiloxane end blocked by trimethylsiloxy groups.

The compositions can comprise, consist essentially of or consist of the stated materials. The process can comprise, consist essentially of or consist of the steps set forth with such materials.

Unless otherwise indicated all parts and percentages are by weight.

The invention is further explained by the following example.

DESCRIPTION OF THE PREFERRED EMBODIMENTS

EXAMPLE (a) 9 grams of silicone oil (a dimethyl polysiloxane) were mixed with 6 grams of precipitated silica in a glass beaker. To improve the flowability there were stirred in additionally 4 grams of pyrogenically produced silica. The contents of the class beaker were placed in a mixer and mixed for 20 seconds. Subsequently there were added in succession in three equal portions a total of 50 grams of pyrogenically produced silica during which after each addition homogenization was carried out for 30 seconds. Next there was added 1 gram of aluminum oxide C to reduce the electrostatic charge and mixing carried out for 5 seconds.

The mixture obtained in this way was tempered for 2 hours at 300° C. The product, which had a bulk density of about 60 grams/l, was compacted with a ball mill to 80–150 grams/l.

The composition of the Hydrophobic Filler Is:
Silica produced pyrogenically: 77.1%
Precipitated Silica: 8.6
Silicone Oil (Baysilon M100, a poly dimethyl siloxane): 12.9%
Aluminum Oxide: 1.4%

The Physical-Chemical Properties of the Hydrophophic Filler Mixtures Is:

| Filler Mixture | A | B | C | D |
|---|---|---|---|---|
| Loss on drying (%) (DIN 55 921) (German Industrial Standard 55 921) | 0.4 | 0.5 | 0.3 | 0.2 |
| Loss on ignition (%) (DIN 55 921) | 2.9 | 2.0 | 3.6 | 3.3 |
| pH (DIN 53 200) | 6.3 | 7.3 | 6.3 | 6.8 |
| Methanol Wettability | 56.0 | 58.0 | 53.0 | 55.0 |
| Carbon Content (%) | 3.12 | 3.56 | 3.60 | 3.48 |

As pyrogenically produced silica there was used for the products A, B, C and D a silica having the following physical-chemical properties.

| BET-Surface Area | $m^2/g$ | 200 |
|---|---|---|
| Average Primary Particle size | nm | 12 |
| Bulk density according to DIN 53 194 | g/l | about 50 |
| Loss on drying according to DIN 55 921 | % | <1.5 |
| Loss on ignition according to DUN 55 921 | % | <2 |
| pH according to DIN 53 200 | | 3.6–4.2 |

For product A there was used as the precipitated silica a silica having the following physical-chemical properties:

| | | |
|---|---|---|
| BET surface area | m²/g | 190 |
| Average Primary Particle size | nm | 18 |
| Bulk density according to DIN 53 194 | g/l | 100 |
| Loss on drying according to DIN 55 921 | % | 6 |
| Loss on ignition according to DIN 55 921 | % | 5 |
| pH According to DIN 53 200 | | 6.3 |

For product B there was used as the precipitated silica a silica having the following physical-chemical properties:

| | | |
|---|---|---|
| BET surface area | m²/g | 190 |
| Average Primary Particle size | nm | 18 |
| Bulk density according to DIN 53 194 | g/l | about 100 |
| Loss on Drying according to DIN 55 921 | % | 6 |
| Loss on ignition according to DIN 55 921 | % | 5 |
| pH according to DIN 53 200 | | 6.3 |

For product C there was used as the prepitated silica a silica having the following physical-chemical properties:

| | | |
|---|---|---|
| BET surface area | m²/g | 170 |
| Average Primary Particle size | nm | 18 |
| Bulk density according to DIN 53 194 | g/l | 70 |
| Loss on drying according to DIN 55 921 | % | 6 |
| Loss on ignition according to DIN 55 921 | % | 5 |
| pH according to DIN 53 200 | | 6.3 |

For product D there was used as the precipitated silica a silica having the following physical-chemical properties:

| | | |
|---|---|---|
| BET surface area | m²/g | 160 |
| Average Primary Particle size | nm | 18 |
| Bulk density according to DIN 53 194 | g/l | 60 |
| Loss on drying according to DIN 55 921 | % | 2.5 |
| Loss on ignition according to DIN 55 921 | % | 3.3 |
| pH according to DIN 53 200 | | 4.5 |

The silicone oil used for products A, B, C and D is a polydimethylsiloxane which is terminated by trimethylsilyl groups and at 20° C. has a kinematic viscosity of about 100 centistokes (Baysilon M100).

The aluminum oxide used for products A, B, C and D was produced pyrogenically and has the following physical-chemical properties:

| | | |
|---|---|---|
| BET surface area | m²/g | 100 |
| Average Primary Particle size | nm | 20 |
| Bulk density according to DIN 53 194 | g/l | about 60 |
| Loss on drying according to DIN 55 921 | | |
| DIN 55 921 | % | <5 |
| Loss on ignition according to DIN 55 921 | % | <3 |
| pH according to DIN 53 200 | | 4-5 |

Extrudability of the Compositions After 90 Days

| Hydrophobic silica Used as Filler | A | B | C | D |
|---|---|---|---|---|
| Extrudability (g/min) | 5.07 | 6.15 | 3.87 | 4.74 |

(b) There are mixed in a Planet mixer 270 grams of a polydimethylsiloxane (Silopren E50) which has terminal silanol groups and a dynamic viscosity of 50,000 mPas with 105 grams of a poly dimethyl siloxane (Baysilon M1000) which is terminated by trimethylsilyl groups and has a viscosity of 1000 mPas and 25 grams of methyl triacetoxy silane for 3 minutes while excluding moisture.

Subsequently there were added 100 grams of the hydrophobic products produced according to Example 1(a) and the mixture stirred twice for 5 minutes each under reduced pressure and with exclusion of moisture. Next there were added 3 drops of dibutyltin diacetate and the mixture stirred twice for 3 minutes each under reduced pressure with the exclusion of moisture. There was formed a pasty composition which solidified under the influence of air moisture to the elastomers.

Extrudability of the Composition Immediately after Production

| Hydrophobic silica used as Filler | A | B | C | D |
|---|---|---|---|---|
| Extrudability (g/min) | 5.33 | 6.77 | 5.02 | 4.70 |

Mechanical Values of the Hardened Elastomers After Standing 8 Days In the Air

| Hydrophobic Silica Used as Filler | A | B | C | D |
|---|---|---|---|---|
| Storage properties | good | good | good | good |
| Modulus 100 (N/mm²) | 0.99 | 1.07 | 1.0 | 0.99 |
| Tensile strength (N/mm²) | 3.18 | 3.00 | 2.78 | 2.85 |
| Elongation at break | 350 | 304 | 332 | 334 |
| Resistance to tear propagation (N/mm²) | 16.73 | 15.32 | 15.53 | 15.77 |
| Shore-A-Hardness | 36 | 35 | 34 | 37 |

Mechanical Data of Elastomers Which Were Produced With Hydrophobic Silicas After Standing 8 Days in the Air

| Hydrophobic Silica Used as Filler | HDK H 2000 | Aerosil* R 972 | Sipernat D 17 |
|---|---|---|---|
| Storage properties | good | good | good |
| Modulus 1000 (N/mm²) | 0.5 | 0.45 | 0.6 |
| Tensile strength (N/mm²) | 2.5 | 1.5 | 3.2 |
| Elongation at break | 430 | 340 | 650 |
| Resistance to tear propagation (N/mm²) | 15 | 3.5 | 14 |
| Shore-A-Hardness | 24 | 21 | 26 |

*Degree of filling only amounts to 12%

Extrudability of the Elastomers Which Were Produced With Commercial Hydrophobic Silicas Immediately After Production

| Hydrophobic Silica Used as Filler | HDK H 2000 | Aerosil R 972 | Silica D 17 |
|---|---|---|---|
| Extrudability (g/min) | 19 | 2.3 | 6 |

The extrudability hardly changed during the storage.

The hydrophobic silica HDK H 2000 used is a pyrogenically produced silica hydrophobized with hexamethyl disilazone and compacted and exhibiting the following physical-chemical properties:

| HDK H 2000 | | |
|---|---|---|
| BET surface area | m²/g | 170 |
| Average Primary Particle size | nm | — |
| Bulk density according to DIN 53 194 | g/l | about 90 |
| Loss on drying according to DIN 55 921 | % | <0.6 |
| Loss on ignition according to DIN 55 921 | % | <2.6 |
| pH according to DIN 53 200 | | 6.7–7.7 |

The hydrophobic silica Aerosil R 972 used is a pyrogenically produced silica hydrophbized with methyl chlorosilanes and exhibiting the following physical-chemical properties:

| Aerosil R 972 | | |
|---|---|---|
| BET surface area | m²/g | 110 |
| Average Primary Particle size | nm | 16 |
| Bulk density according to DIN 53 194 | g/l | about 50 |
| Loss on drying according to DIN 55 921 | % | 0.5 |
| Loss on ignition according to DIN 55 921 | % | 2 |
| pH according to DIN 53 200 | | 3.5–4.1 |

The hydrophobic silica D 17 used is a precipitated silica hydrophobized with methyl chlorosilanes and exhibiting the following properties:

| Sipernat D 17 | | |
|---|---|---|
| BET surface area | m²/g | 110 |
| Average Primary Particle size | nm | 28 |
| Bulk density according to DIN 53 194 | g/l | 80 |
| Loss on drying according to DIN 55 921 | % | 3 |
| Loss on ignition according to DIN 55 921 | % | 7 |
| pH according to DIN 53 200 | | 7 |

The entire disclosure of German priority application No. P 2929587.2-43 is hereby incorporated by reference.

What is claimed is:

1. A hydrophobic filler mixture consisting essentially of 50 to 85 weight % of pyrogenically produced silica, 5 to 40 weight % of precipitated silica, 8 to 30 weight % of a hydrophobizing agent and 0.5 to 5 weight % of aluminum oxide.

2. A hydrophobic filler mixture according to claim 1 wherein the hydrophobizing agent is a silicone oil.

3. A hydrophobic filler mixture according to claim 2 wherein the silicone oil is a linear or cyclic organopolysiloxane in which the free valences of the silica not bonded to oxygen are joined to organic groups or hydrogen, said silicone oil having a viscosity at 20° C. between 3 and 1,000 mPaS.

4. A hydrophobic filler mixture according to claim 3 wherein the silicone oil has a viscosity at 20° C. between 20 and 500 mPaS.

5. A hydrophobic filler mixture according to claim 2 wherein the silicone oil is a dimethyl polysiloxane having a viscosity between 5 and 300 centistokes.

6. A process for producing the hydrophobic filler mixtures of claim 1 comprising mixing 8 to 30 parts of the hydrophobizing agent with 5 to 40 parts of precipitated silica, adding 50 to 85 parts of pyrogenically produced silica, mixing, adding 0.5 to 5.0 parts of aluminum oxide, mixing, tempering the thus obtained mixture for 0.5 to 3 hours at 250° to 330° C. and compacting the thus obtained product to a bulk density of 80 to 150 grams/l.

7. An RTV or LTC silicone rubber composition containing the hydrophobic filler mixture of claim 1.

8. An RTV or LTV silicone rubber composition containing the hydrophobic filler mixture of claim 2.

9. An RTV or LTV silicone rubber composition containing the hydrophobic filler mixture of claim 3.

10. An RTV or LTV silicone rubber composition containing the hydrophobic filler mixture of claim 4.

11. An RTV or LTV silicone rubber composition containing the hydrophobic filler mixture of claim 5.

* * * * *